United States Patent
Ardö et al.

(10) Patent No.: US 9,554,046 B2
(45) Date of Patent: Jan. 24, 2017

(54) METHOD AND IMAGE PROCESSING DEVICE FOR IMAGE STABILIZATION OF A VIDEO STREAM

(71) Applicant: Axis AB, Lund (SE)

(72) Inventors: Björn Ardö, Lund (SE); Niklas Lindman, Furulund (SE); Timo Sachse, Neustadt (DE)

(73) Assignee: Axis AB, Lund (SE)

(*) Notice: Subject to any disclaimer, the term of this patent is extended or adjusted under 35 U.S.C. 154(b) by 0 days.

(21) Appl. No.: 14/857,077

(22) Filed: Sep. 17, 2015

(65) Prior Publication Data
US 2016/0094765 A1 Mar. 31, 2016

(30) Foreign Application Priority Data
Sep. 25, 2014 (EP) .................................... 14186303

(51) Int. Cl.
*H04N 5/228* (2006.01)
*H04N 7/18* (2006.01)
(Continued)

(52) U.S. Cl.
CPC ............ *H04N 5/2327* (2013.01); *G06T 11/60* (2013.01); *H04N 5/144* (2013.01); *H04N 5/2329* (2013.01);
(Continued)

(58) Field of Classification Search
CPC .............. H04N 5/23248; H04N 5/2329; H04N 5/23251; H04N 5/23258; H04N 5/23264; H04N 5/23274; H04N 5/144; H04N 5/23261; H04N 5/23267; H04N 5/23254

USPC ................. 348/208.99, 208.12, 208.2, 208.4
See application file for complete search history.

(56) References Cited

U.S. PATENT DOCUMENTS 8,134,604 B2 * 3/2012 Fujita ..................... H04N 5/145
348/208.6
8,417,059 B2 * 4/2013 Yamada ................ G06T 7/0042
348/154
(Continued)

FOREIGN PATENT DOCUMENTS

GB 2 220 319 A 1/1990
GB 2 316 255 A 2/1998
(Continued)

OTHER PUBLICATIONS

EP 14 18 6303.5 European Search Report (Feb. 12, 2015).

*Primary Examiner* — Ngoc-Yen Vu
(74) *Attorney, Agent, or Firm* — Volpe and Koenig, P.C.

(57) ABSTRACT

The present invention relates to an image processing device arranged for image stabilization of a video stream comprising image frames captured by a video camera, the image processing device comprising: an electronic image stabilization module arranged to perform electronic image stabilization to sub-sets of image frames of the image frames of the video stream to compensate for a oscillating movement of the video camera; and a masking module arranged to apply an edge mask to each sub-set of image frames, wherein each edge mask is having a fixed width, wherein the fixed width is based on a camera oscillation amplitude being specific for the sub-set of image frames to which the edge mask is applied. The present invention also relates to a method for image stabilization of a video stream.

15 Claims, 5 Drawing Sheets

(51) Int. Cl.
*H04N 5/232* (2006.01)
*G06T 11/60* (2006.01)
*H04N 5/77* (2006.01)
*H04N 5/14* (2006.01)

(52) U.S. Cl.
CPC ...... *H04N 5/23248* (2013.01); *H04N 5/23254* (2013.01); *H04N 5/23261* (2013.01); *H04N 5/23267* (2013.01); *H04N 5/772* (2013.01); *H04N 7/183* (2013.01)

(56) References Cited

U.S. PATENT DOCUMENTS

| | | | |
|---|---|---|---|
| 8,798,387 B2* | 8/2014 | Yamada | H04N 5/23254 382/254 |
| 9,258,485 B2* | 2/2016 | Wang | H04N 5/23274 |
| 9,319,587 B2* | 4/2016 | Takao | H04N 5/23254 |
| 2005/0057661 A1 | 3/2005 | Tanaka | |
| 2006/0017817 A1* | 1/2006 | Okubo | H04N 5/23274 348/208.99 |
| 2008/0170124 A1* | 7/2008 | Hatanaka | G06T 5/004 348/208.4 |
| 2008/0231718 A1 | 9/2008 | Garg | |
| 2009/0079842 A1* | 3/2009 | Wilson | H04N 5/23248 348/222.1 |
| 2013/0028472 A1 | 1/2013 | Pham | |
| 2015/0271408 A1* | 9/2015 | Cancel Olmo | H04N 5/23248 348/208.6 |

FOREIGN PATENT DOCUMENTS

| | | |
|---|---|---|
| WO | 96/20560 A1 | 7/1996 |
| WO | 2004056089 A2 | 7/2004 |

* cited by examiner (A)

(B)

(C)

METHOD AND IMAGE PROCESSING DEVICE FOR IMAGE STABILIZATION OF A VIDEO STREAM

FIELD OF INVENTION

The present invention relates to the field of image stabilization of a video stream comprising image frames captured by a video camera. In particular it relates to a method for image stabilization of a video stream and an image processing device arranged to perform image stabilization of a video stream.

BACKGROUND

Video streams captured by video cameras may suffer from a problem known as camera shake. For example, a video camera mounted at an area for, e.g., monitoring the area may from time to time experience shakes or vibrations due to shifting environmental factors, such as wind, vehicles (e.g. airplanes, trains, trucks, etc.) entering or leaving the area, construction work, etc. Such shakes or vibrations will induce movement of the video camera, thereby causing a captured video stream to shake.

Prior art systems for image stabilization reducing the effects of camera shake often include electronic manipulation of a video stream captured by the video camera before displaying the video stream. By doing so the viewer is presented with a stable view of the video stream despite the induced movement of the video camera. This electronic manipulation is based on determining an image shift between image frames of the video stream captured by the video camera. Depending on the image read out technique used, the image shift and hence the method of electronic manipulation of a video stream may differ. In case a global shutter is used, i.e. an entire image frame is read out simultaneously, the whole content of an image frame is shifted in order to compensate for the vibration of the video camera. In case a rolling shutter is used, i.e. an image is read out one or a few row(s) at a time, each row or a few rows in the image frames is/are shifted individually since they are exposed at different points in time. For the sake of simplicity, in the examples disclosed below, global shutter read out is used for explaining the electronic image stabilization, however, it should be understood that rolling shutter read out may as well be used for achieving the same result. Hence, the term image shift should be understood as a shift between the whole image content of two image frames or a shift between the image content of one or a few rows of two image frames.

An image shift determination may be made in various ways. One way of determining the image shift is to use sensors within the video camera to measure movement of the camera and with knowledge of the focal length of the camera lens, a corresponding image shift on a camera sensor may be calculated. Alternatively, features within the scene depicted by the video stream believed to be stationary between image frames may be tracked using image processing techniques.

Once the image shift has been measured each of a plurality of image frames of the video stream is shifted in accordance with the measured image shift to compensate for the image shift caused by camera movement. Thereby a viewer may be provided with a stable displayed view of the scene depicted by the video stream.

A prior art image stabilization system will be explained in more detail in connection with FIG. 1.

In FIG. 1(A) an example of a displayed video stream affected by video camera shake or vibration is presented. More precisely, a plurality of superimposed image frames of the video stream depicting a scene of a person 1 and a tree 2 is presented. The video camera shake or vibration induces movement of the video camera. Due to the movement of the video camera the person 1 and the tree 2 move to various positions within the displayed image frames. The superposition of image frames representative of the video stream of the scene captured at different positions of the video camera has an effect of obscuring visual information of the scene. Therefore, FIG. 1(A) presents a representation of an unstable video stream of the person 1 and the tree 2.

In FIG. 1(B) the image frames of the video stream are displayed after determining and applying image shift between the image frames. Hence, FIG. 1(B) is a representation of a video stream after electronic image stabilization according to the above has been applied to the unstable video stream presented in FIG. 1(A). In FIG. 1(B), the stabilized video stream is now centrally located and stable within the display. Hence, the image stabilization system operates to shift each image frame such that the person 1 and the tree 2 appear to be stable in the display. However, as the electronic image stabilization operates to shift entire image frames, part of the displayed video stream will not contain any displayed information and will therefore appear blank. Furthermore, as indicated in FIG. 1(B) by solid lines 3, 4, 5, 6, 7, which are representative of the edges of the displayed image frames, the edges of the video stream will continuously be moving as the image stabilization system operates to present a stable video stream of the scene. In practice, the image stabilization system, hereinbefore described, suffers a disadvantage in that although the image stabilization system operates to stabilize an image within the centre of a display, the peripheral region of the displayed video stream will be continuously moving, which is distracting to the viewer.

To alleviate this problem the prior art image stabilization systems operate to expand or zoom in the displayed view such that only the stable central part of the video stream is displayed. FIG. 1(C) presents the stabilized video stream depicting the scene of the person 1 and the tree 2, expanded to fill the display. In practice, the prior art image stabilization includes an always present digital zooming in of 10-20%. This implies that even when the image is stable, image information around the edges of the image frames is lost. Hence, peripheral image information will be lost, thereby greatly reducing the value of the image information of the video stream. The digital zooming in also implies that the video stream is displayed with a lower resolution than supplied by an image sensor of the video camera.

SUMMARY

In view of the above, it is an object of the present invention to provide a method and an image processing device for image stabilization, wherein the disadvantages of the aforementioned prior art are substantially reduced.

According to a first aspect of the invention, the above object is achieved by a method for image stabilization of a video stream comprising image frames captured by a video camera, the video stream depicting a scene. The method comprises: performing electronic image stabilization to a first sub-set of image frames of the image frames of the video stream to compensate for a first oscillating movement of the video camera such that at least a portion of each image frame of the image frames of the first sub-set of image frames are building up a stable first view of the scene;

applying a first edge mask to the first stable view of the scene, the first edge mask having a first width based on a first camera oscillation amplitude; comparing the first camera oscillation amplitude with a second camera oscillation amplitude, if the second camera oscillation amplitude differs from the first camera oscillation amplitude by a predetermined amount, the method further comprises: performing electronic image stabilization to a second sub-set of image frames of the image frames of the video stream to compensate for a second oscillating movement of the video camera such that at least a portion of each image frame of the image frames of the second sub-set of image frames are building up a stable second view of the scene; applying a second edge mask to the second stable view of the scene, the second edge mask having a second width based on the second camera oscillation amplitude; wherein the second sub-set of image frames is a set of image frames being captured later in time than the first sub-set of image frames.

A video stream captured by a video camera is a representation of a scene within the field of view of the video camera in accordance with light emanating from the scene and passing into the video camera. An image frame is a signal or an amount of data representative of the video stream captured at a particular time. This is literally true if a global shutter is used. However, if a rolling shutter is used, different parts of the frame will be taken at slightly different times. These slightly different times are very close in time. Thus, regardless of which shutter is used, the resulting image frame is considered to be captured at a particular time.

By applying electronic image stabilization and applying edge masks being dependent on the camera oscillation amplitude for any given set of image frames the full resolution of the image sensor may be used at all times and still having a stable view. Moreover, when the oscillation of the camera decreases or even ceases a greater area of the image sensor may be used. By applying the edge mask being dependent on the oscillation amplitude of the camera the amount of vibration of the camera may be visualized in a clear and simple manner.

The first camera oscillation amplitude may be a measure of an average oscillation amplitude during a time interval wherein the image frames of the first sub-set of image frames are captured.

The first camera oscillation amplitude may be a measure of a maximum oscillation amplitude during the time interval wherein the image frames of the first sub-set of image frames are captured.

The second camera oscillation amplitude may be a measure of an average oscillation amplitude during a time interval wherein the image frames of the second sub-set of image frames are captured.

The second camera oscillation amplitude may be a measure of a maximum oscillation amplitude during the time interval wherein the image frames of the second sub-set of image frames are captured.

The first and second camera oscillation amplitudes may be the respective measure of the maximum oscillation amplitude or the average oscillation amplitude with an addition of a predetermined amount or percentage. The addition of the predetermined amount may, e.g., be 10-20% of the oscillation amplitude. The addition of the predetermined amount may account for an increase in vibration amplitude without the need of rapid modification of the width of the edge mask.

If the second camera oscillation amplitude is below a predetermined threshold the method may further comprise stepwise decreasing the width of edge masks for sub-sets of image frames being subsequent to the first sub-set of image frames. The predetermined threshold may be indicative of the video camera being substantially stable. Substantially stable may be dependent on the use case (i.e., how much vibration can the viewer live with before needing stabilisation). A feature typically being built-in in electronic image stabilization systems is that when the camera is considered stable, electronic image stabilization stops. Hence, the electronic image stabilization system may be used to determine if the camera is substantially stable. By applying the stepwise decrease of the width of edge masks for sub-sets of image frames being subsequent to the first sub-set of image frames quick changes in a displayed video stream will be avoided, Quick changes in a displayed video stream may disturb the view of the video stream to such extent that the viewer misses some other feature being present in the video stream.

The performing of electronic image stabilization may comprise measuring movement of the video camera using a motion sensor arranged in the video camera.

The performing of electronic image stabilization may comprise tracking one or more features in the scene using image processing.

The first and second camera oscillating amplitudes may be determined based on data from a motion sensor measuring movement of the camera. The first and second camera oscillating amplitudes may be determined based on tracking of one or more features in the scene using image processing.

The edge masks may be frame-shaped masks surrounding the stable view of the scene. Frame-shaped means that the frame is surrounding the stable view of the scene just as a picture frame.

According to a second aspect of the present invention an image processing device arranged for image stabilization of a video stream comprising image frames captured by a video camera is provided. The image processing device comprises: an electronic image stabilization module arranged to perform electronic image stabilization to sub-sets of image frames of the image frames of the video stream to compensate for a oscillating movement of the video camera; and a masking module arranged to apply an edge mask to each sub-set of image frames, wherein each edge mask is having a fixed width, wherein the fixed width is based on a camera oscillation amplitude being specific for the sub-set of image frames to which the edge mask is applied.

The above mentioned features of the method, when applicable, apply to this second aspect as well. In order to avoid undue repetition, reference is made to the above.

The masking module may be arranged to determine the camera oscillation amplitude for a sub-set of image frames as a measure of an average oscillation amplitude during a time interval wherein the sub-set of image frames is captured or a measure of a maximum oscillation amplitude during the time interval wherein the sub-set of image frames is captured.

The electronic image stabilization module may comprise: an image shift determination module arranged to determine image shifts between image frames of the video stream, the image shifts being caused by an oscillating movement of the video camera; and an image shift module arranged to produce a stable view of a scene depicted by the video stream by applying shifts on image content of the image frames in accordance with the determined image shifts to compensate for the oscillating movement of the video camera.

The image processing device may be a video camera comprising a motion sensor arranged to sense oscillating movement of the video camera, wherein the masking module is arranged to determine the camera oscillation amplitudes based on data from the motion sensor.

According to a third aspect of the present invention a non-transitory computer-readable recording medium having recorded thereon a program for implementing the method according to the first aspect executed on a device having processing capabilities is provided.

The above mentioned features of the method and device, when applicable, applies to this third aspect as well. In order to avoid undue repetition, reference is made to the above.

Generally, all terms used in the claims are to be interpreted according to their ordinary meaning in the technical field, unless explicitly defined otherwise herein. All references to "a/an/the [device, object, step etc.]" are to be interpreted openly as referring to at least one instance of said device, object, step etc., unless explicitly stated otherwise. The steps of any method disclosed herein do not have to be performed in the exact order disclosed, unless explicitly stated.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person. The systems and devices disclosed herein will be described during operation.

Figure 1:
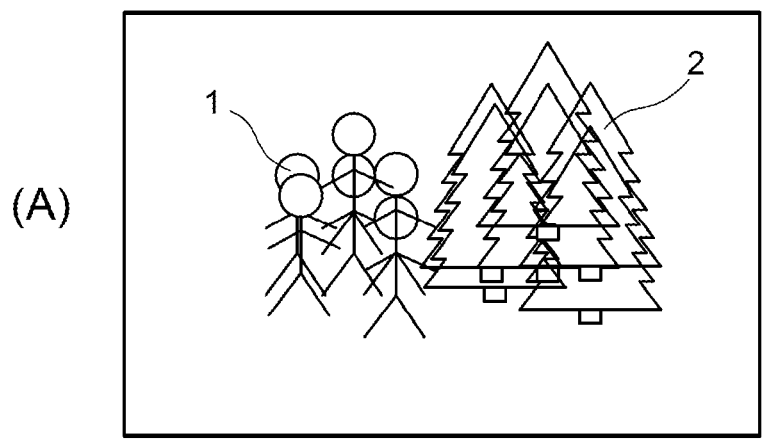
FIG. 1 is a conceptual illustration of image stabilization according to prior art.
Figure 1:
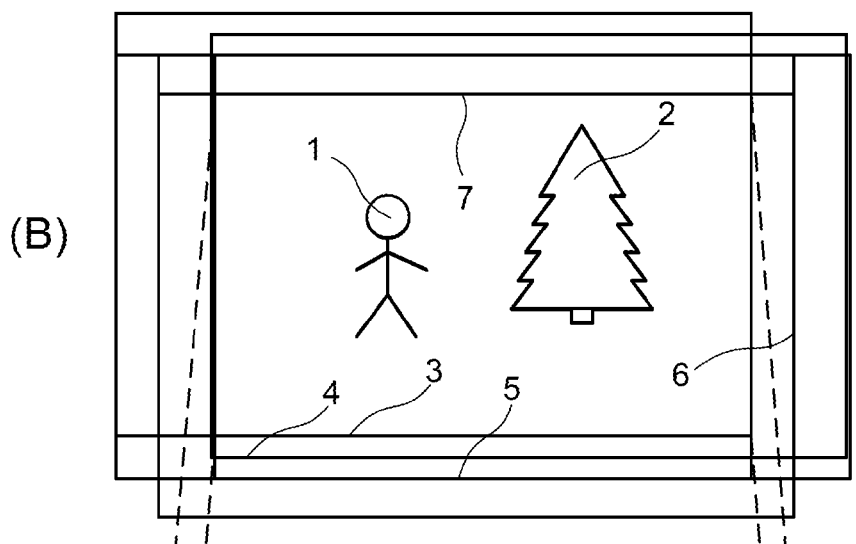
Figure 1:
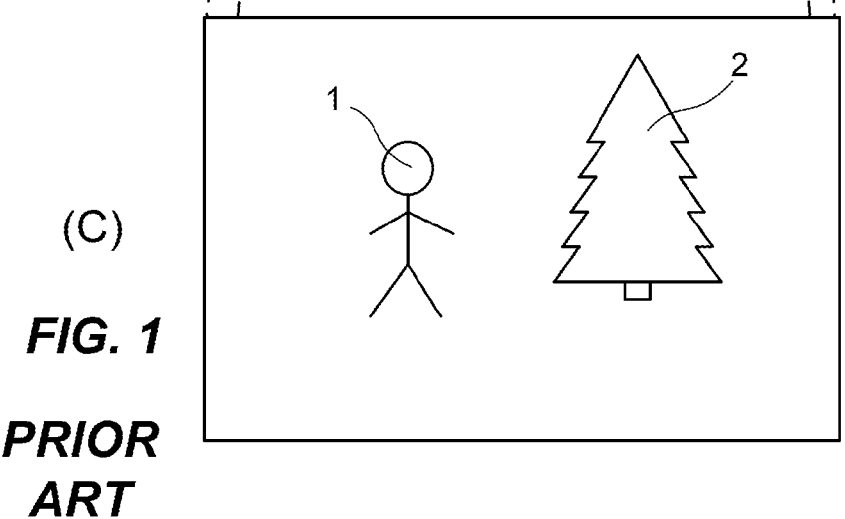
Figure 2:
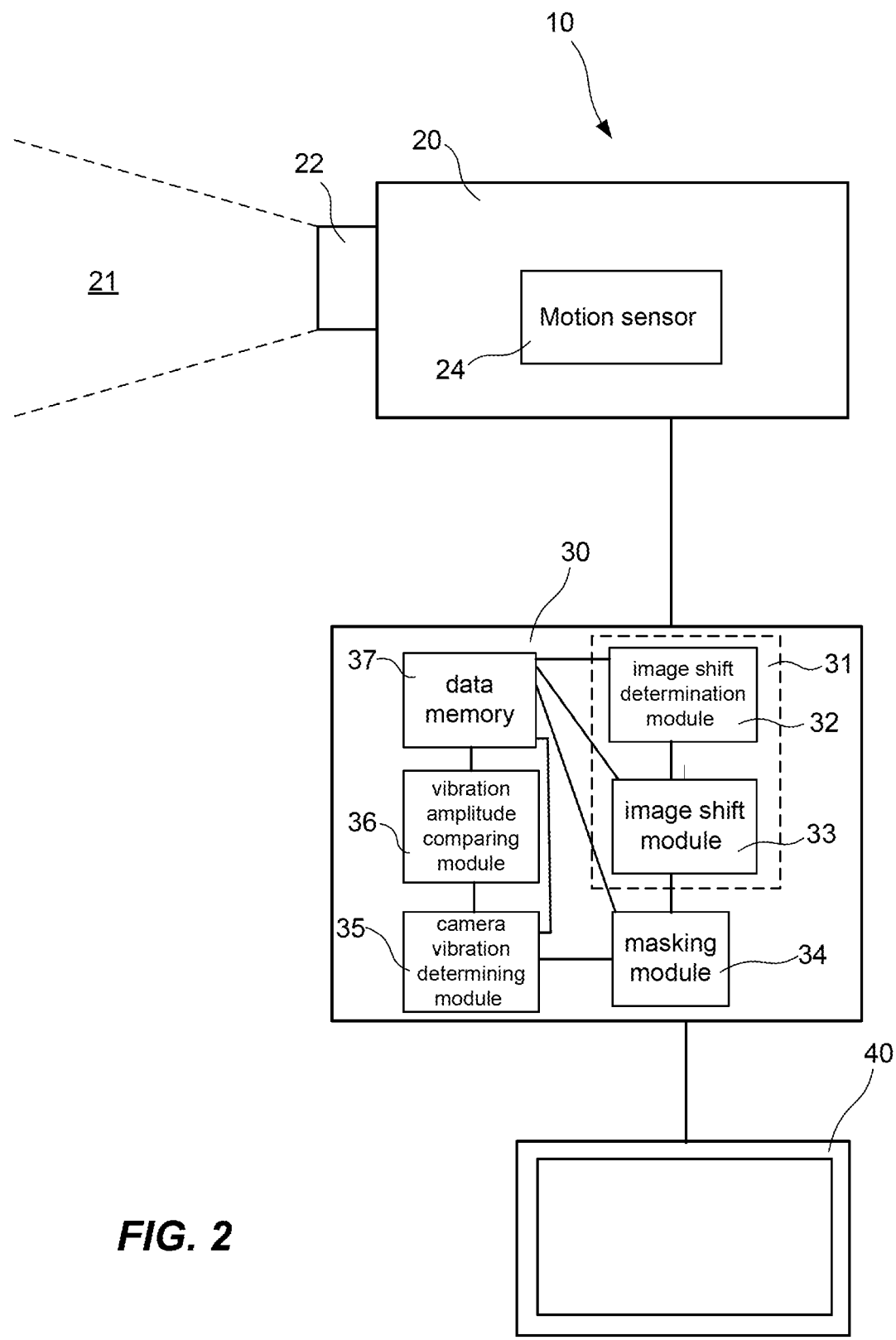
FIG. 2 is a block diagram of an image stabilizing system according to the present invention.

FIG. 2 is a block diagram of an image stabilizing system 10 according to the present invention. The image stabilizing system 10 comprises a video camera 20, an image processing device 30 and a display 40.

The video camera 20 is positioned such that a scene of interest is within a field of view 21. The video camera 20 may be arranged for monitoring the area. The video camera 20 comprises an adjustable focusing lens arrangement 22. The video camera 20 may be arranged to output a signal carrying information pertaining to the focal length of the focusing lens arrangement 22. The video camera 20 may be a monitoring camera for monitoring the area in front of the video camera. The video camera 20 operates to generate image frames of information representative of a video stream captured by the video camera 20 of the scene of interest within the field of view 21.

From time to time the video camera 20 experiences shakes or vibrations due to shifting environmental factors, such as wind, vehicles (e.g. airplanes, trains, trucks, etc.) entering or leaving the area, construction work, etc. Such shakes or vibrations will induce movement of the video camera 20, thereby causing a video stream captured by the video camera 20 to shake.

The video camera 20 may also, as shown in the embodiment of FIG. 2 comprise a motion sensor 24. The motion sensor 24 is arranged to sense movement of the video camera 20. The motion sensor 24 is arranged to output a signal corresponding to the movement of the video camera 20. According to a specific embodiment the signal outputted from the motion sensor 24 is corresponding to a camera vibration amplitude. The motion of the camera due to the shake or vibration of the camera is an oscillating movement wherein each oscillation has an oscillation amplitude. The camera vibration amplitude is a measure of one or more of the oscillation amplitudes. The camera vibration amplitude may, e.g., be a measure of the average oscillation amplitude during a predetermined time interval or a measure of the maximum oscillation amplitude during a predetermined time interval.

Moreover, the camera vibration amplitude may be divided into components. Hence, the camera vibration amplitude may, e.g., have one component pertaining to the horizontal movement of the camera and one component pertaining to the vertical movement of the camera.

According to the embodiment disclosed in connection with FIG. 2 the video camera 20 is a digital video camera. However, it should be realized that also an analog video camera may be used in connection with the present invention. In case the image stabilization system comprises an analog video camera, analog image frames are communicated from the analog video camera to an analog to digital converter (not shown), which operates to generate digital representations of the analog image frames.

The (digital) image frames captured by the video camera 20 are fed to the image processing device 30. The image processing device 30 comprises an image shift determination module 32, an image shift module 33, a masking module 34, a camera vibration determining module 35 and a vibration amplitude comparing module 36. The modules 32, 33, 34, 35, 36 of the image processing device 30 may be implemented as software code run by a processing unit, as hardware implemented in the image processing device 30 or as a combination thereof. The image processing device 30 may also comprise a data memory 37. The image shift determination module 32, the image shift module 33, the masking module 34, the vibration determining module 35 and/or the vibration amplitude comparing module 36 may be arranged to store and/or retrieve data from/on the data memory 37.

The image processing device 30 is arranged to receive signals from the video camera 20. Especially, the image processing device 30 is arranged to receive the image frames of the video stream generated by the video camera 20. The image processing device 30 may also be arranged to receive the signal outputted from the motion sensor 24. The image processing device 30 may further be arranged to receive the signal carrying information pertaining to the focal length of the focusing lens arrangement 22.

Figure 3:
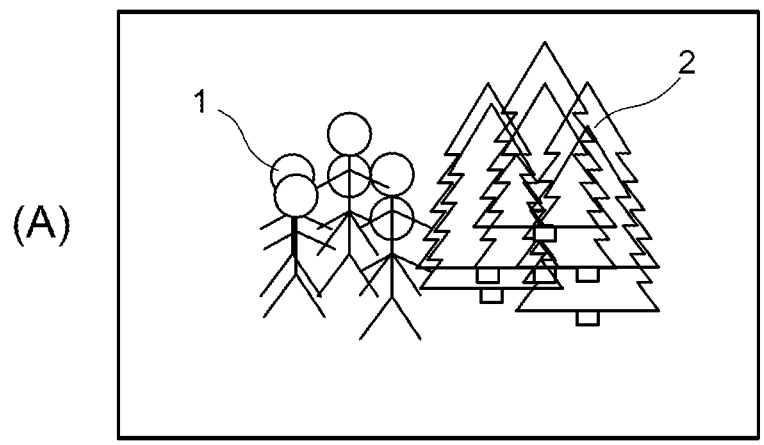
FIG. 3 is a conceptual illustration of image stabilization according to the present invention.
Figure 3:
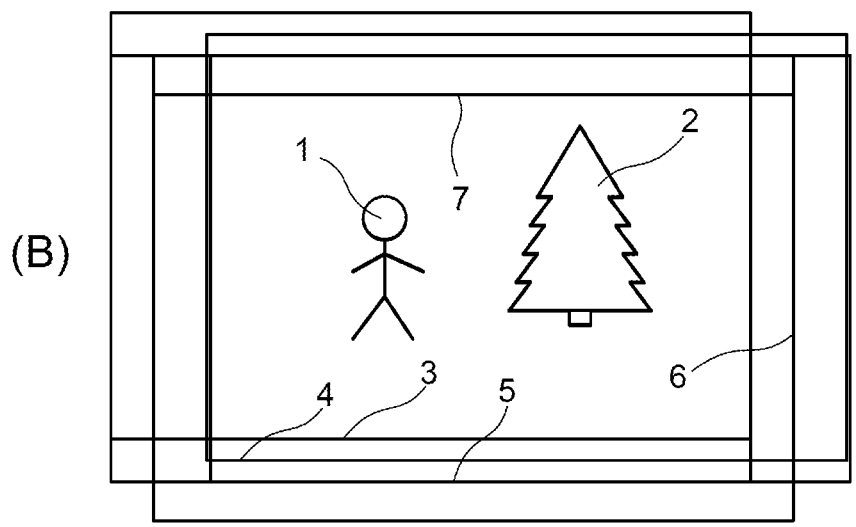
Figure 3:
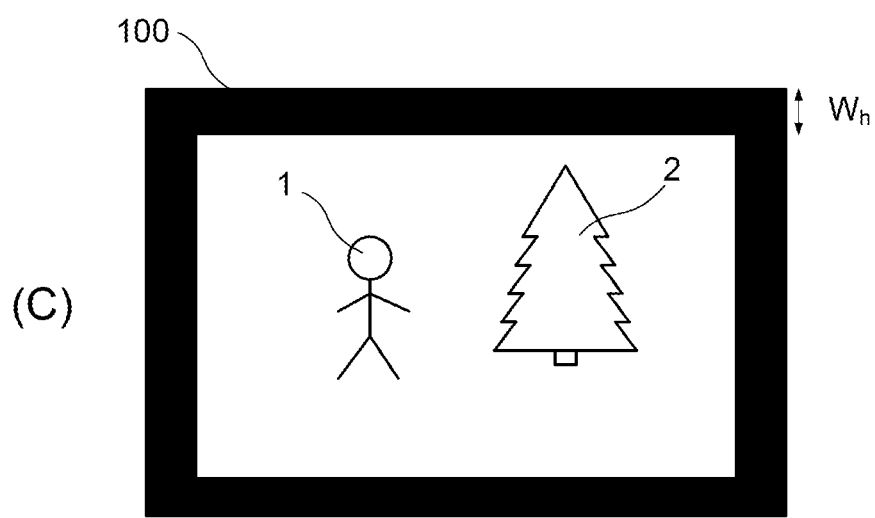

In FIG. 3(A) an example of image frames of a video stream affected by video camera movement before image stabilization has been performed is presented. More precisely, a plurality of superimposed image frames of the video stream depicting a scene of a person 1 and a tree 2 is presented. The video camera shake or vibration induces movement of the video camera. Due to the movement of the video camera the person 1 and the tree 2 move to various positions within the displayed image frames. The superposition of image frames representative of the video stream of the scene captured at different positions of the video camera has an effect of obscuring visual information of the scene. Therefore, FIG. 3(A) presents a representation of an unstable video stream of the person 1 and the tree 2.

In order to reduce the effects of the movement of the camera, the image frames of the video stream are electronically manipulated before displaying the video stream. The image shift determination module 32 operates to determine an image shift between image frames of the video stream captured by the video camera. As mentioned above, depending on image frame read out technique, the image shift and hence the method of electronic manipulation of a video stream may differ. In case a global shutter is used, i.e. an entire image frame is read out simultaneously, the whole content of an image frame is shifted in order to compensate for the vibration of the video camera. In case a rolling shutter is used, i.e. an image is read out one or a few rows at a time, each row or a few rows in the image frames is/are shifted individually since they are exposed at different points in time. For the sake of simplicity, in the examples disclosed below, global shutter read out is used for explaining the electronic image stabilization, however, it should be understood that rolling shutter read out may as well be used for achieving the same result. Hence, the term image shift should be understood as a shift between the whole image content of two image frames or a shift between the image content of one or a few rows of two image frames.

The image shift determination module 32 may operate in various ways. According to one embodiment the image shift determination module 32 is arranged to use information pertaining to the signal outputted from the motion sensor 24 together with knowledge of the focal length of the focusing lens arrangement 22 in order to determine a corresponding image shift on an image sensor of the video camera 20. Alternatively, features within the scene depicted by the video stream believed to be stationary between image frames may be tracked using image processing techniques. Such image processing techniques are well known to the person skilled in the art and will not be further discussed here. The image shift determination module 32 is further arranged to communicate the determined image shifts to the image shift module 33.

Once the image shift has been determined by means of the image shift determination module 32 the image shift module 33 is arranged to shift the image frames of the video stream in accordance with the determined image shifts to compensate for the image shift caused by camera movement. Hence, the image shift module 33 is arranged to produce a stable view of the video stream depicting the scene in front of the video camera 20. This is made by applying a shift on each image frame in accordance with the determined shifts to compensate for the vibration of the video camera 20. By doing so, the viewer is presented with a stable view of the video stream despite the induced movement of the video camera. Thereby, a viewer may be provided with a stable displayed view of the scene depicted by the video stream.

In FIG. 3(B) a representation of a video stream after image stabilization has been applied to the unstable video stream presented in FIG. 3(A) is presented. In FIG. 3(B) the image frames of the video stream are displayed after determining and applying image shifts between the image frames. Hence, FIG. 3(B) is a representation of a video stream after electronic image stabilization according to the above has been applied to the unstable video stream presented in FIG. 3(A). In FIG. 3(B), the stabilized video stream is now centrally located and stable within the display. Hence, the image stabilization system operates to shift each image frame such that the person 1 and the tree 2 appear to be stable in the display. However, as the image stabilization operates to shift entire image frames, part of the displayed video stream will not contain any displayed information and will therefore appear blank. Furthermore, as indicated in FIG. 3(B) by solid lines 3, 4, 5, 6, 7, which are representative of the edges of the displayed image frames, the edges of the video stream will continuously be moving as the image stabilization system operates to present a stable video stream of the scene. Hence, the peripheral region of the displayed video stream will be continuously moving, which is distracting to the viewer.

According to the present invention this problem is alleviated by applying an edge mask to the stable view of the video stream. The masking module 34 is arranged to apply the edge mask to the image frames of the video stream. In FIG. 3(C) the edge mask 100 is applied to the displayed video stream. The edge mask 100 covers/hides the area of the video stream wherein the edges of the video stream will continuously be moving as the image stabilization operates to present a stable image of the scene.

In the embodiment shown in FIG. 3(C) the edge mask 100 is in the form of an opaque black frame. However, any color of the opaque frame may be used. Alternatively, the edge mask 100 could be a frame made up of image data gathered over time and shown in black and white whilst the rest of the video stream is shown in color. Further alternatively, the edge mask 100 could be a frame made up of image data gathered over time and shown as blurred image data.

The width, W, of the edge mask is dependent on the movement of the video camera 20 due to a vibration of the video camera 20. Hence, the width, W, of the edge mask is dependent on the camera vibration amplitude. According to the embodiment shown in FIG. 3(C) the width W of the edge mask 100 has one horizontal and one vertical component, $W_h$ and $W_v$, respectively. The horizontal component, $W_h$, of the width of the edge mask 100 depends on a vertical component of the movement of the video camera, i.e. a vertical camera vibration amplitude. The vertical component, $W_v$, of the width of the edge mask 100 depends on a horizontal component of the movement of the video camera, i.e. a horizontal camera vibration amplitude. The horizontal camera vibration amplitude may be different from the vertical camera vibration amplitude. Hence, the horizontal component, $W_h$, of the width of the edge mask 100 may be different from the vertical component, $W_v$, of the width of the edge mask 100. A relation between the horizontal component $W_h$ and the vertical component $W_v$ of the width of the edge mask 100 may be set such that an aspect ratio of the image is maintained.

The camera vibration determining module 35 is arranged to determine the camera vibration amplitude. The motion of the camera due to the shake or vibration of the camera is an oscillating movement wherein each oscillation has an oscillation amplitude. The camera vibration amplitude is a measure of one or more of the oscillation amplitudes. The camera vibration amplitude may, e.g., be a measure of the average oscillation amplitude during a predetermined time interval or a measure of the maximum oscillation amplitude during a predetermined time interval.

The camera vibration determining module 35 may simply be arranged to determine the camera vibration amplitude by receiving the signal outputted from the motion sensor 24 corresponding to the camera vibration amplitude. Alternatively, the camera vibration determining module 35 may be arranged to determine the camera vibration amplitude by processing the signal corresponding to the movement of the video camera 20, the signal corresponding to the movement of the video camera 20 being outputted by the motion sensor 24 of the video camera 20. Further alternatively, the camera vibration determining module 35 may be arranged to determine the camera vibration amplitude by processing the image shifts being determined by the image shift determination module 32. Further, the camera vibration determining module 35 may be arranged to determine a camera vibration amplitude pertaining to the horizontal movement of the video camera and a camera vibration amplitude pertaining to the vertical movement of the camera.

The masking module 34 is arranged to apply the edge mask 100 having a specific width to a plurality of image frames of the video stream. The plurality of image frames of the video stream may be consecutive image frames. The masking module 34 may be arranged to apply the edge mask 100 having a specific width to the image frames of the video stream for at least a predetermined time. The predetermined time is in the order of seconds or more. Hence, the number of the plurality of image frames of the video stream depends on the frame rate of the video stream and the predetermined time. Thus, while displaying image frames of a first set of image frames a first edge mask having a first width is applied to a stable first view of the scene.

Figure 4:
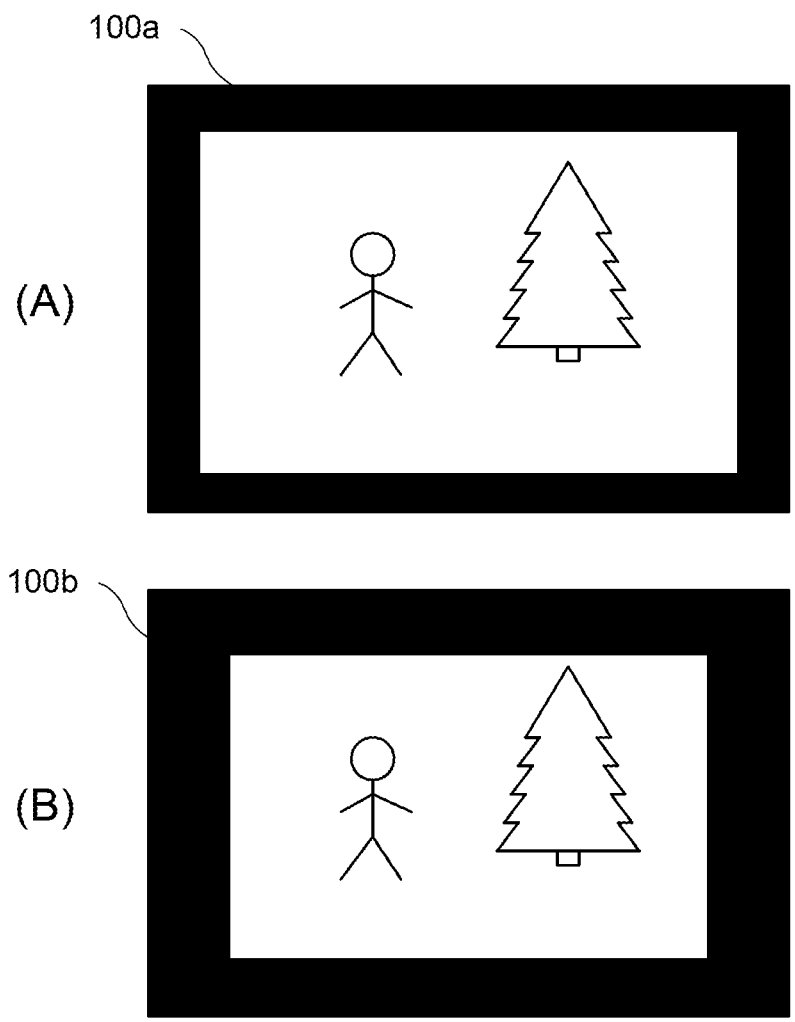
FIG. 4 is a conceptual illustration of the use of edge masks having different widths.

The camera vibration amplitude is generally changing over time. The vibration amplitude comparing module 36 is arranged to compare camera vibration amplitudes at different points in time. For example, after displaying the image frames of the first set of image frames, with a first edge mask 100*a* applied thereto, the vibration amplitude comparing module 36 is arranged to compare a first camera vibration amplitude experienced by the video camera 20 during capturing of the first set of image frames with a second camera vibration amplitude experienced by the video camera 20 during capturing of a second set of image frames. The second set of image frames is captured after the first set of image frames. The first set of image frames may be consecutive image frames. The second set of image frames may be consecutive image frames. In case the second camera vibration amplitude differs from the first camera vibration amplitude by a predetermined amount, the masking module 34 is arranged to apply a second edge mask 100*b* having a second width to a stable second view of the scene. The use of edge masks 100*a*, 100*b* having different widths is illustrated in FIG. 4. The first edge mask 100*a* illustrated in FIG. 4 (A) is used for the first set of image frames while displaying the first stable view of the scene, and the second edge mask 100*b* illustrated in FIG. 4 (A) is used for the second set of image frames while displaying the second stable view of the scene. In the shown embodiment the second edge mask 100*b* has a larger width than the first edge mask 100*a*. However, it should be understood that the second edge mask 100*b* may have a smaller width than the first edge mask 100*a*. Moreover, the widths of the first and second edge masks may be the same. It shall also be noticed that the first edge mask may have different horizontal and vertical widths and/or the second edge mask may have different horizontal and vertical widths.

The width of the first edge mask depends on the first camera oscillation amplitude. The width of the second edge mask depends on the second camera oscillation amplitude. Alternatively, the width of the second edge mask depends on the first camera oscillation amplitude, the second camera oscillation amplitude, and the time that has passed between capturing the first and second set of image frames.

The vibration amplitude comparing module 36 or the camera vibration determining module 35 may be arranged to detect if the camera vibration amplitude is below a predetermined threshold; the predetermined threshold is being indicative of the video camera being substantially stable. A feature typically being built-in in electronic image stabilization systems is that when the camera is considered stable, electronic image stabilization stops. Hence, the electronic image stabilization system may be used to determine if the camera is stable.

In case it is determined that the camera vibration amplitude is below a predetermined threshold the masking module 34 is arranged to, for sets of image frames being subsequent to the first set of image frames, apply edge masks with stepwise decreasing widths. In one embodiment the width of the edge masks is stepwise decreased until the edge mask has no width.

According to one embodiment of the invention, it is advantageous to instantly, upon detection of vibration of the camera, add a wide enough edge mask and when vibration of the camera ceases, decrease the width gradually and slowly.

The image frames of the stabilized video streams may be fed to the display 40 for displaying the video stream depicting the scene to a viewer.

In FIG. 2 the video camera 20, the image processing device 30 and the display 40 are illustrated as separate devices. However, it should be realized that the image processing device 30 and/or the display 40 may be arranged within the video camera 20.

Figure 5:
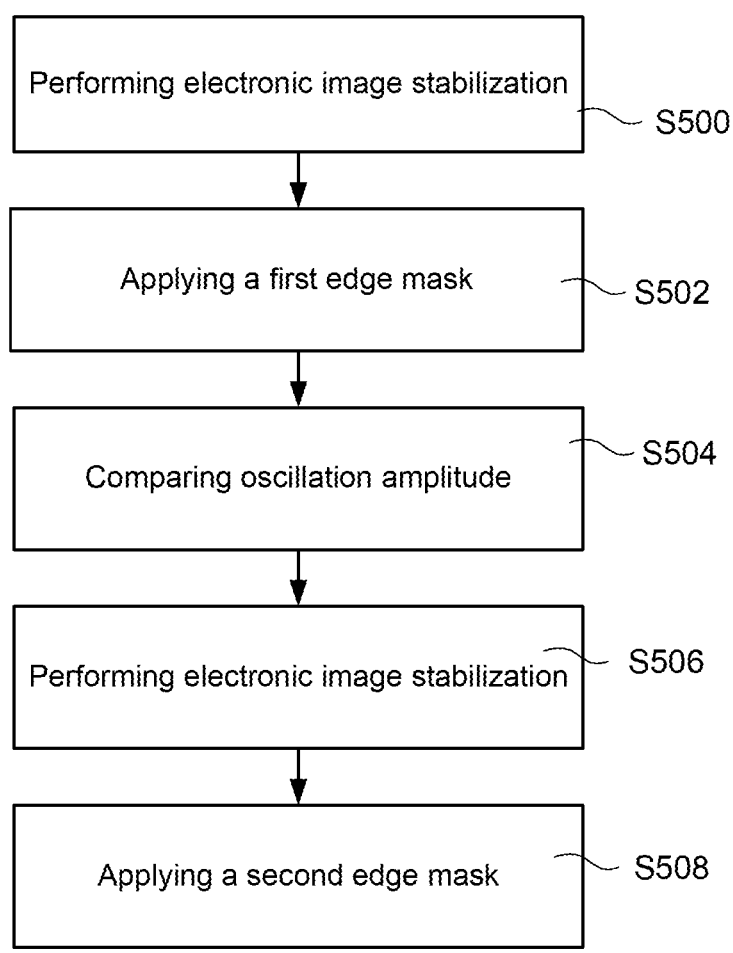
FIG. 5 is a block diagram of an embodiment of a method for image stabilization of a video stream according to the present invention.

In FIG. 5 a block diagram of a method for image stabilization of a video stream according to the present invention is shown. More precisely the present invention is directed towards a method for image stabilization of a video stream comprising image frames captured by a video camera, the video stream depicting a scene. The method comprises: performing (S500) electronic image stabilization to a first sub-set of image frames of the image frames of the video stream to compensate for a first oscillating movement of the video camera such that at least a portion of each image frame of the image frames of the first sub-set of image frames are building up a stable first view of the scene; applying (S502) a first edge mask to the first stable view of the scene, the first edge mask having a first width based on a first camera oscillation amplitude; comparing (S504) the first camera oscillation amplitude with a second camera oscillation amplitude, if the second camera oscillation amplitude differs from the first camera oscillation amplitude by a predetermined amount, the method further comprises: performing (S506) electronic image stabilization to a second sub-set of image frames of the images frames of the video stream to compensate for a second oscillating movement of the video camera such that at least a portion of each image frame of the image frames of the second sub-set of image frames are building up a stable second view of the scene; applying (S508) a second edge mask to the second stable view of the scene, the second edge mask having a second width based on the second camera oscillation amplitude;

wherein the second sub-set of image frames is a set of image frames being captured later in time than the first sub-set of image frames.

Additionally, variations to the disclosed embodiments can be understood and effected by the skilled person in practicing the claimed invention, from a study of the drawings, the disclosure, and the appended claims.

Moreover, in the drawings and specification, there have been disclosed preferred embodiments and examples of the invention and, although specific terms are employed, they are used in a generic and descriptive sense only and not for the purpose of limitation, the scope of the invention being set forth in the following claims. The word "comprising" does not exclude other elements or steps, and the indefinite article "a" or "an" does not exclude a plurality.

What is claimed is:

1. A method for image stabilization of a video stream comprising image frames captured by a video camera, the video stream depicting a scene, the method comprising:
    performing electronic image stabilization to a first sub-set of image frames of the image frames of the video stream to compensate for a first oscillating movement of the video camera such that at least a portion of each image frame of the image frames of the first sub-set of image frames are building up a stable first view of the scene;
    applying a first edge mask to the first stable view of the scene, the first edge mask having a first width based on a first camera oscillation amplitude;
    comparing the first camera oscillation amplitude with a second camera oscillation amplitude, if the second camera oscillation amplitude differs from the first camera oscillation amplitude by a predetermined amount, the method further comprises:
    performing electronic image stabilization to a second sub-set of image frames of the image frames of the video stream to compensate for a second oscillating movement of the video camera such that at least a portion of each image frame of the image frames of the second sub-set of image frames are building up a stable second view of the scene;
    applying a second edge mask to the second stable view of the scene, the second edge mask having a second width based on the second camera oscillation amplitude;
    wherein the second sub-set of image frames is a set of image frames being captured later in time than the first sub-set of image frames; and
    wherein the first and second edge masks are made up of image data gathered over time and shown in black and white or as blurred image data whilst the rest of the video stream is shown in color.

2. The method according to claim 1, wherein the first camera oscillation amplitude is a measure of an average oscillation amplitude during a time interval wherein the image frames of the first sub-set of image frames are captured or a measure of a maximum oscillation amplitude during the time interval wherein the image frames of the first sub-set of image frames are captured and wherein the second camera oscillation amplitude is a measure of an average oscillation amplitude during a time interval wherein the image frames of the second sub-set of image frames are captured or a measure of a maximum oscillation amplitude during the time interval wherein the image frames of the second sub-set of image frames are captured.

3. The method according to claim 2, wherein the first and second camera oscillation amplitudes are the respective measure of the maximum oscillation amplitude or the average oscillation amplitude with an addition of a predetermined amount or percentage.

4. The method according to claim 1, wherein if the second camera oscillation amplitude is below a predetermined threshold the method further comprises stepwise decreasing the width of edge masks for sub-sets of image frames being subsequent to the first sub-set of image frames.

5. The method according to claim 4, wherein the predetermined threshold is indicative of the video camera being substantially stable.

6. The method according to claim 1, wherein the performing of electronic image stabilization comprises measuring movement of the video camera using a motion sensor arranged in the video camera.

7. The method according to claim 1, wherein the performing of electronic image stabilization comprises tracking one or more features in the scene using image processing.

8. The method according to claim 1, wherein the first and second camera oscillating amplitudes are determined based on data from a motion sensor measuring movement of the camera.

9. The method according to claim 1, wherein the first and second camera oscillating amplitudes are determined based on tracking of one or more features in the scene using image processing.

10. The method according to claim 1, wherein the edge masks are frame-shaped masks surrounding the stable view of the scene.

11. An image processing device arranged for image stabilization of a video stream comprising image frames captured by a video camera, the image processing device comprising:
    an electronic image stabilization module arranged to perform electronic image stabilization to sub-sets of image frames of the image frames of the video stream to compensate for an oscillating movement of the video camera; and
    a masking module arranged to apply an edge mask to each sub-set of image frames, wherein each edge mask is having a fixed width, wherein the fixed width is based on a camera oscillation amplitude being specific for the sub-set of image frames to which the edge mask is applied,
    wherein the edge mask is made up of image data gathered over time and shown in black and white or as blurred image data whilst the rest of the video stream is shown in color.

12. The device according to claim 11, wherein the masking module is arranged to determine the camera oscillation amplitude for a sub-set of image frames as a measure of an average oscillation amplitude during a time interval wherein the sub-set of image frames is captured or a measure of a maximum oscillation amplitude during the time interval wherein the sub-set of image frames is captured.

13. The device according to claim 11, wherein the electronic image stabilization module comprises:
    an image shift determination module arranged to determine image shifts between image frames of the video stream, the image shifts being caused by an oscillating movement of the video camera; and
    an image shift module arranged to produce a stable view of a scene depicted by the video stream by applying shifts on image content of the image frames in accordance with the determined image shifts to compensate for the oscillating movement of the video camera.

14. The device according to claim 11, wherein the device is a video camera comprising a motion sensor arranged to sense oscillating movement of the video camera, wherein the masking module is arranged to determine the camera oscillation amplitudes based on data from the motion sensor.

15. A non-transitory computer-readable storage medium storing computer program instructions that, when executed on a device having processor capabilities, cause the device to perform a method for performing image stabilization of a video stream, the video stream comprising image frames captured by a video camera and depicting a scene, the method comprising:

performing electronic image stabilization to a first sub-set of image frames of the image frames of the video stream to compensate for a first oscillating movement of the video camera such that at least a portion of each image frame of the image frames of the first sub-set of image frames are building up a stable first view of the scene;

applying a first edge mask to the first stable view of the scene, the first edge mask having a first width based on a first camera oscillation amplitude;

comparing the first camera oscillation amplitude with a second camera oscillation amplitude, if the second camera oscillation amplitude differs from the first camera oscillation amplitude by a predetermined amount, the method further comprises:

performing electronic image stabilization to a second sub-set of image frames of the image frames of the video stream to compensate for a second oscillating movement of the video camera such that at least a portion of each image frame of the image frames of the second sub-set of image frames are building up a stable second view of the scene;

applying a second edge mask to the second stable view of the scene, the second edge mask having a second width based on the second camera oscillation amplitude;

wherein the second sub-set of image frames is a set of image frames being captured later in time than the first sub-set of image frames; and wherein the first and second edge masks are made up of image data gathered over time and shown in black and white or as blurred image data whilst the rest of the video stream is shown in color.

* * * * *